A. Fickett,
Belt Fastener.

Nº 25,187.   Patented Aug. 23, 1859.

Witnesses;
Jno Phin
Saml Shadbok

Inventor;
Albert Fickett

UNITED STATES PATENT OFFICE.

ALBERT FICKETT, OF ROCHESTER, NEW YORK.

BELT-FASTENING.

Specification of Letters Patent No. 25,187, dated August 23, 1859.

*To all whom it may concern:*

Be it known that I, ALBERT FICKETT, of the city of Rochester, in the county of Monroe and State of New York, have invented certain new and useful Improvements in the Means of Uniting the Ends of Belts or Straps for Communicating Motion in Machinery; and I do hereby declare the following to be a full and accurate description of the same, reference being had to the accompanying drawings, making part of this specification, and to the letters of reference marked thereon, same letters referring to like parts in all the figures.

Figure 1:
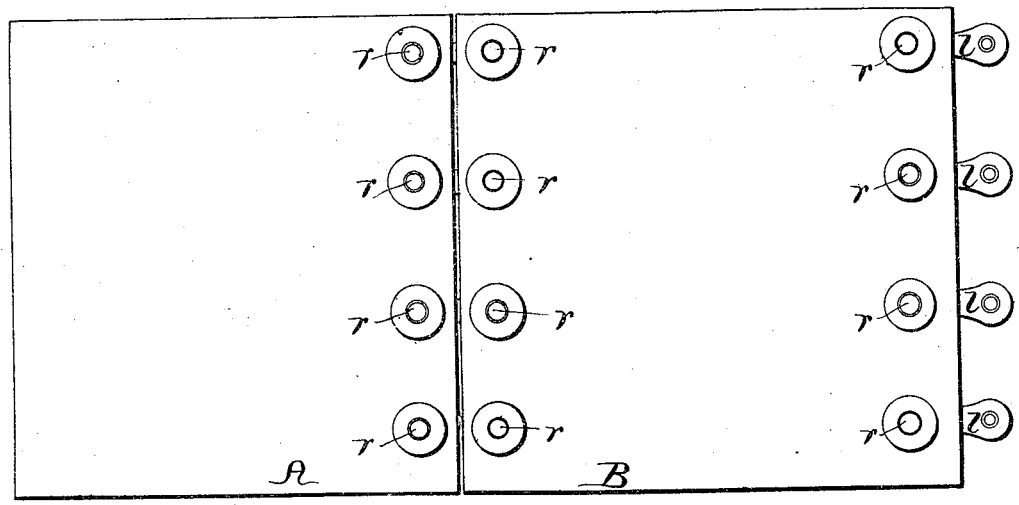
Figure 2:
Figure 3:
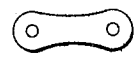

Of said drawings, Figure 1 is a plan of a section of belt united upon my improved plan. Fig. 2 is a section of the same showing the arrangement of the links and rivets. Fig. 3 is a detail figure of a link.

The invention consists in inserting small loops or links, made of any suitable material such as brass, steel, or green hide into the ends of straps and fixing them there by means of copper or other rivets in the manner shown in the drawing, where A and B, are two sections of a leather belt, one end of the links $l\ l\ l$ being inserted into and riveted in the end of the strap A and the other ends of the same links being attached to the end of the section B in a similar manner. The links are inserted by first making an incision by means of a suitable knife or fleam and then after inserting the links they are secured by the rivets $r\ r\ r$. The links of a certain number being all of the same size and shape form a sufficient guide in making the holes for the rivets. The advantages of this mode of attaching the rivets are sufficiently obvious and consist in the fact that there are no overlapping ends and no extra thickness at the point of junction which is perfectly even. Neither is there any heavy weight such as is inevitably the case with clasps or buckles and which at high speed have a strong tendency to destroy the belt as well as being very inconvenient. Here on the contrary there is nothing of the kind and if the links are made of an elastic or flexible material the belt will accommodate itself to the smallest sized pulley as well at the joint as at any other part. Not only this but where the pulley is convex (that is to say where its surface forms a segment of a spheroid, not a section of a cylinder) as pulleys are usually made, these links allow the belt to accommodate itself to this curve in a manner which the straight clasp or buckle can never do. The same feature manifests itself in instances where belts are crossed, for here again the straight clasp interferes materially with the twisting which is necessary to the perfect action of the belt in such cases.

Where tightening pulleys as they are technically called are used it is found necessary to render both sides of the belt perfectly smooth. This can easily be done when my method is used by hammering the rivets sufficiently. But when buckles or clasps are employed this cannot be done and in such cases the clasp is very apt to jerk the pulley at every revolution and thus totally destroy its efficiency.

Having thus fully described my invention what I claim therein as new and desire to secure by Letters Patent is—

The combination of the links $l\ l\ l$ with the rivets $r\ r\ r$ said links being inserted in the ends of the belt in the manner and for the purpose substantially as described.

ALBERT FICKETT.

Witnesses:
JOHN PLINE,
SAML. SHADBOTS.